(12) United States Patent
Maier et al.

(10) Patent No.: US 6,910,183 B2
(45) Date of Patent: Jun. 21, 2005

(54) FILE TAGGING AND AUTOMATIC CONVERSION OF DATA OR FILES

(75) Inventors: Andreas Maier, Stuttgart (DE); Wolfgang Reichert, Holzgerlingen (DE); David Brush, Woodstock, NY (US); John Kapernick, Brewster, NY (US); Milos Lalovic, Toronto (CA); William B. Nettles, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 683 days.

(21) Appl. No.: 09/800,139

(22) Filed: Mar. 6, 2001

(65) Prior Publication Data

US 2001/0037337 A1 Nov. 1, 2001

(30) Foreign Application Priority Data

Mar. 8, 2000 (DE) ......................................... 001 04 922

(51) Int. Cl.[7] .............................................. G06F 15/00
(52) U.S. Cl. ...................... 715/523; 715/522; 715/524; 717/136; 717/140; 707/101
(58) Field of Search ................................ 717/136–138, 717/139, 140; 715/522, 523–524; 719/315; 707/101, 102, 204

(56) References Cited

U.S. PATENT DOCUMENTS

| 4,337,458 | A | * | 6/1982 | Cohn et al. .................... 341/55 |
| 5,497,491 | A | * | 3/1996 | Mitchell et al. ............. 719/315 |
| 5,507,030 | A | * | 4/1996 | Sites ......................... 717/136 |
| 5,878,422 | A | * | 3/1999 | Roth et al. .................. 707/100 |
| 5,941,978 | A | * | 8/1999 | Finni ......................... 712/28 |
| 5,956,510 | A | * | 9/1999 | Nicholas ...................... 717/137 |
| 5,978,815 | A | * | 11/1999 | Cabrera et al. .............. 707/204 |
| 6,009,436 | A | * | 12/1999 | Motoyama et al. ......... 707/102 |
| 6,230,310 | B1 | * | 5/2001 | Arrouye et al. ............. 717/136 |
| 6,678,867 | B2 | * | 1/2004 | Fong et al. .................. 715/523 |
| 6,748,587 | B1 | * | 6/2004 | Santhanam et al. ......... 717/140 |

OTHER PUBLICATIONS

TITLE: Efficient Recompression Techniques for Dynamic Full–Text Retrieval Systems, author: Klein, ACM, 1995.*
TITLE: Universal Coding of Band–Limited Sources by Sampling and Dithered Quantization, author: Zamir et al, IEEE, 1992.*
Microsoft Press Computer Dictionary, Third Edition, published on 1997.*

* cited by examiner

Primary Examiner—Chameli C. Das
(74) Attorney, Agent, or Firm—Lawrence D. Cutter; William A. Kinnaman, Jr.

(57) ABSTRACT

The present invention provides facilities for tagging files or data with attribute information in the form of a file tag (TAGINFO) which contains an identifier for text information (TEXTFLAG) and an attribute (COSID) for identifying encoding schemes. TXTFLAG is an auto conversion flag. Furthermore, a runtime attribute (process CCSLD) is assigned to a process specifying the runtime encoding scheme. A conversion is done automatically by an auto conversion function if both CCSIDs allow a conversion. Files having no file tag are tagged with a virtual file tag by means of an automatic tagging (AUTOTAG) function using heuristic rules for determining whether the data or file contains text or binary information. Old applications must work with untagged files as before. Existing applications should be able to benefit from auto conversion and thereby to be enabled to process new, tagged files without code changes.

26 Claims, 9 Drawing Sheets

FILE TAGGING AND AUTOMATIC CONVERSION OF DATA OR FILES

BACKGROUND OF THE INVENTION

1. Field of the Invention

The present invention relates to a method and system for exchanging data between programs using different encoding schemes, especially for exchanging data between different platforms using different encoding schemes or codepages.

2. Description of the Related Art

Many client/server applications exchange and share data between different platforms. The platforms may use different codepages either caused by different encoding schemes (ASCII, EBCDIC, Unicode) or caused by national language settings. ASCII stands for American Standard Code for Information Interchange, a code in which each alphanumeric character is represented as an 8-bit binary code for the computer. ASCII is used by most microcomputers and printers and on the Internet, and because of this, text-only files can be transferred easily between different kinds of computers. For the representation of national language characters a set of different ASCII codepages is defined.

EBCDIC stands for Extended Binary Coded Decimal Interchange Code, an 8-bit binary code for larger IBM computers in which each byte represents one alphanumeric character. Different EBCDIC codepages are defined as well to represent national language characters.

Unicode stands for a character set that uses 16 bits (two bytes) for each character, and therefore is able to include more characters than ASCII or EBCDIC. Unicode can have 65,536 characters, and therefore can be used to encode almost all the languages of the world. Unicode includes the ASCII character set within it.

The burden of detecting and managing different codepages is currently left to the application. Applications which have been developed for one platform (e.g. ASCII UNIX) cannot easily be extended to run in a heterogeneous environment and share data (e.g. AIX/6000 (ASCII) and OS/390 UNIX (EBCDIC)). Supporting a heterogeneous environment goes far beyond porting the application.

Furthermore, many applications depend on one encoding scheme (e.g. ASCII) while utilities provided by the operating system require that files contain the data in their native encoding scheme (e.g. OS/390 UNIX System Services expects EBCDIC files).

Porting applications from an ASCII-based platform to EBCDIC-based platform, such as OS/390, often involves a time-consuming analysis of any character set encoding used with the program itself and in data passed to the program from the user or a file. For data passed into an application from a file, methods are required to recognize if the file contains encoded characters, and if so, what coded character set was used.

U.S. Pat. No. 5,784,544 describes a data type detection facility for determining the data type of an incoming stream of data. The characters of the data stream are first tested to determine if they are valid characters of one data type (e.g., EBCDIC). A count of the valid characters is obtained. Then, the data stream is assumed to be of another data type (e.g., ASCII), and the characters of the data stream are translated from that data type to the first data type. After the translation, the same test for valid characters is made and another count is obtained. The two counts are then compared to determine the data type of the data stream.

This assumption technique may cause the following problems:

1. The assumption may be incorrect which would result in wrong conversion. This is uncritical if the data is presented to a human being that is able to ascertain the correctness. For example if the data is displayed or printed incorrect conversion results in an unreadable presentation which can be detected easily. Indeed, printing is mentioned as implementation example in this patent. The assumption technique is unacceptable if relevant business data is to be processed by another program because it could result in lost or wrong data. Furthermore, the assumption technique is only applicable if the language or language group (e.g. Latin1=Western European Languages) is known. The described method would not be applicable to distinguish between codepages belonging to the same encoding scheme, for example, between EBCDIC French and EBCDIC Czech. Finally, the assumption technique also requires that a reasonable amount of data is available to be tested. Some implementations check the first 256 characters before making a decision. If only a few characters are available the method may fail.

2. Performance: Because a reasonable amount of data has to be inspected before data can be processed this method causes some processing overhead.

It is therefore an object of the present invention to provide a system and method allowing an improved exchange of data or files which are being coded in different encoding schemes between different programs which use only one encoding scheme.

It is a further object of the present invention to provide a system and method allowing an improved exchange of data or files within a heterogeneous environment.

Finally, it is an object of the present invention to provide a system or method allowing an improved exchange of data or files without requiring adaptations either on the data or the files or in the program code itself.

SUMMARY OF THE INVENTION

These objects are solved by the features of the independent claims. Further preferred embodiments of the present invention are laid down in the subclaims.

The present invention provides facilities for tagging files or data with attribute information in the form of a file tag (TAGINFO) which contains an identifier for text information (TXTFLAG) and an attribute (CCSID) for identifying encoding schemes. TXTFLAG is an auto conversion flag that inhibits automatic conversion between encoding schemes when switched off, while CCSID is an encoding scheme identifier. Furthermore, a runtime attribute (process CCSID) is assigned to a process specifying the runtime encoding scheme. A conversion is done automatically by an auto conversion function if both CCSIDs allow a conversion. Files having no file tag are tagged with a virtual file tag (default tag) by means of an automatic tagging (AUTOTAG) function using heuristic rules for determining whether the data or file contains text or binary information. Old applications must work with untagged files as before. Existing applications should be able to benefit from auto conversion and thereby to be enabled to process new, tagged files without code changes. This invention allows one to physically store data in the process codepage of the application thereby avoiding any conversions in the frequently used path while the file tagging and auto conversion does not inhibit other programs running in a different codepage from accessing the data.

BRIEF DESCRIPTION OF THE DRAWINGS

The present invention will be described in more detail using preferred embodiments with figures, where.

DESCRIPTION OF THE PREFERRED EMBODIMENT

The present invention, especially the creation and use of file tags, will be summarized as follows.

Preferably a new compiler option PROGRAM (EBCDIC|ASCII) is used to indicate whether initialization should set up an EBCDIC or an ASCII CODESET. The program option will also tell the compiler whether to generate EBCDIC or ASCII character literals and string literals in the program object. The program object attribute which identifies the CODESET (ASCII or EBCDIC or UNICODE) of the compiled program is laid down in the header of the main entry point of the program object.

Each newly created file has a tag containing an identifier for text information and a codepage attribute. The file tag is stored together with the other attributes of the file in the file system, e.g. file directory. The file directory is extended with tag information by means of runtime and the I/O access method. The following tag situations may be distinguished:
1. Untagged local files: A default file attribute is specified at mount time and matches the local system configuration.
2. Remote files: Since other platforms may not support file tagging a default attribute is defined per mount point of the network file system. This relates to the system configuration of the remote system. If the remote platform supports file tagging surely existing tags overwrite the default attribute. New files get the attribute from the program that creates the file. As a file tag either the initial program tag is used or the codepage that has been derived from the current user settings. Furthermore the application may overwrite the file tag for a particular file at file creation time. For pseudo files (pipes, sockets, message queues, special files/devices) similar ideas apply.

When reading from or writing to an existing text file the operating system compares the program attribute with that of the file. If they differ the operating system verifies whether a consistent, data-preserving conversion is possible. For that purpose a correspondence table is used. This table lists all codepages that contain the same character set. If a consistent conversion is possible such an automatic conversion is set up. If it is not possible an error is indicated. Automatic conversion does not apply to binary file access.

The conversion is transparent to the application. The application code does not need to be changed nor does the application need to know the actual codepage of the file.

In most cases a program does specify whether it reads/writes a file in text mode or in binary mode by using appropriate function calls. A new open option allows one to specify text mode explicitly; this is intended for those cases where a program uses a binary mode function call although it is processing a text file.

Figure 1:
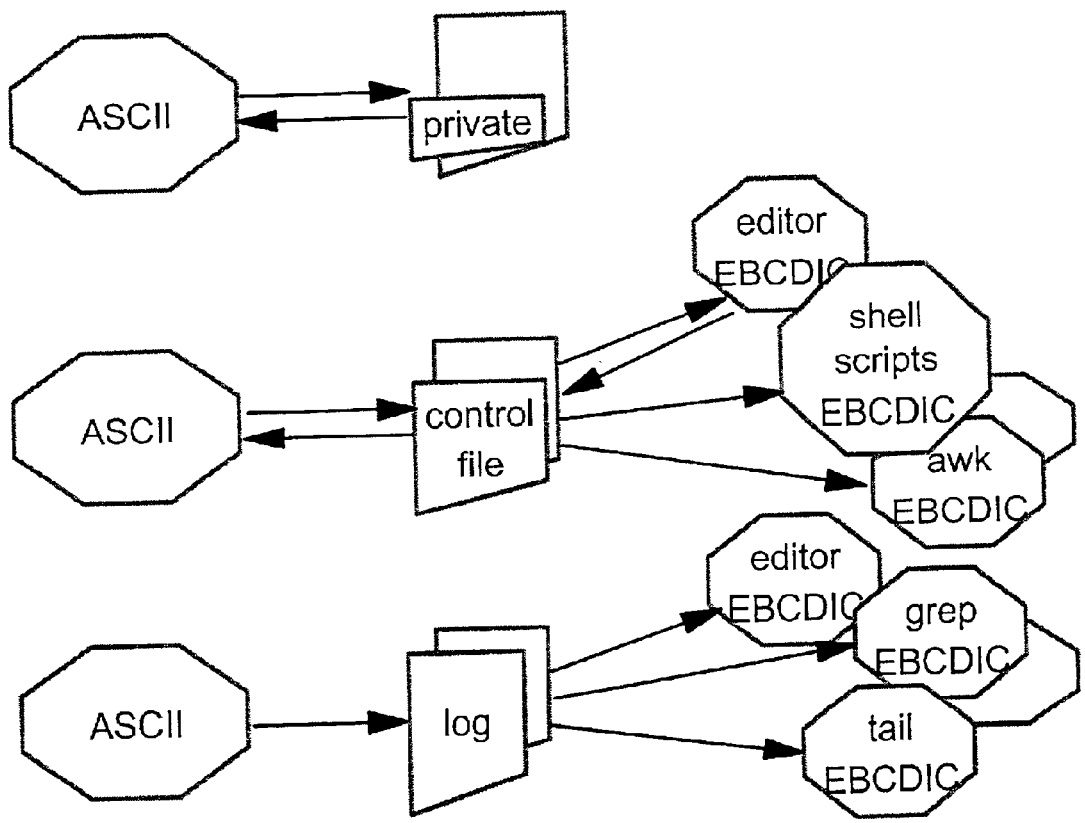
FIG. 1 shows a typical communication architecture in a host system in which the present invention may be implemented.

In FIG. 1 a host system is shown using a mixed platform supporting ASCII and EBCDIC data and programs.

Assume that the files created and/or processed by the ASCII program can be classified as follows:

Private Files

Contents and structure of the private files is defined by the application. Those files are not intended to be processed by other programs except by those applications that have knowledge about the structure and content of those files.) Those files should be tagged as NOTEXT (TXTFLAG=OFF).

Control Files

The contents of those files is strictly text. For international applications it is usually restricted to the POSIX portable characters. Those files are intended to be edited or processed by UNIX utilities. Conversion back and forth preserves the contents. For the application as well as for the utilities it should not matter who has created them and whether they are ASCII and EBCDIC; the auto conversion will ensure that the program gets it in the right codepage. Those files should be tagged as TEXT (TXTFLAG=ON) and with the CCSID.

Log Files

These text files are written by the application. The user must be able to peek at them or read them with UNIX utilities. The files do not contain business relevant data which are to be processed by another application program. Processing is basically limited by browsing them, sorting, grep on error indicators etc. Those files should be tagged as TEXT and with the CCSID, even if they do not strictly contain pure text (maybe they include some hex characters).

Figure 2:
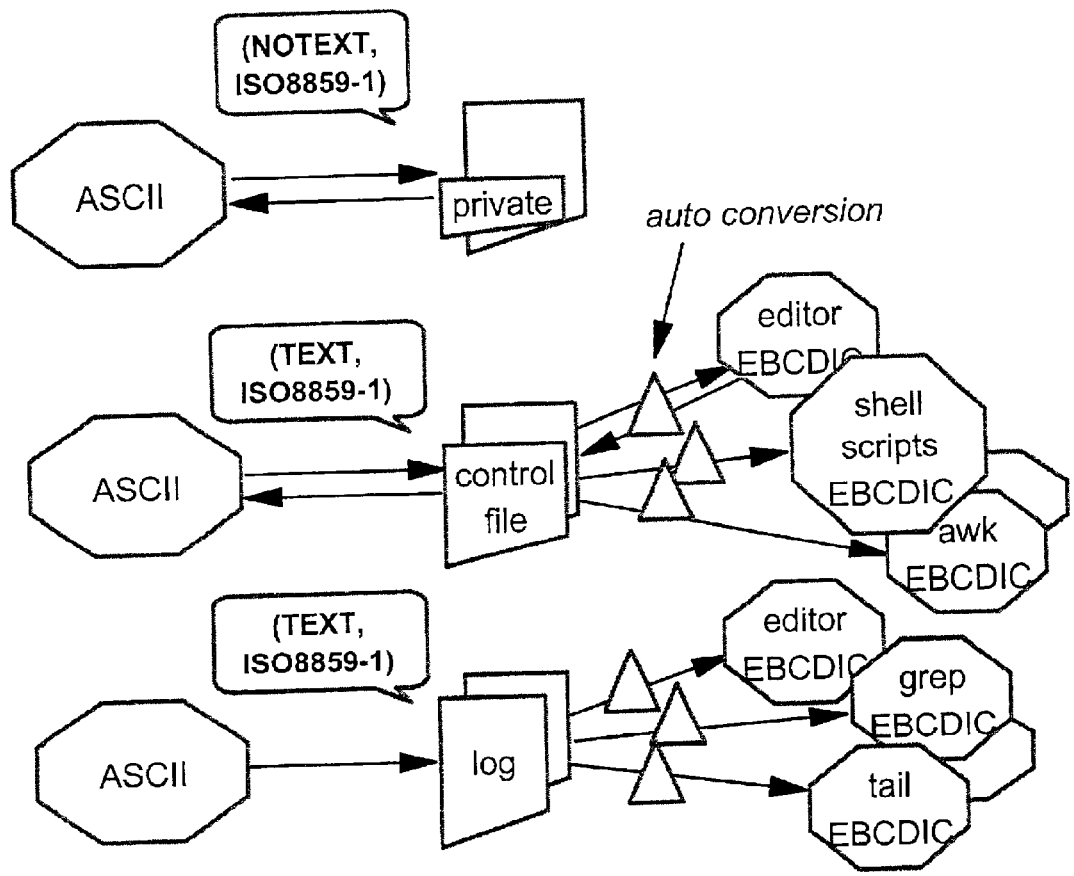
FIG. 2 shows the communication architecture according to FIG. 1 using the inventive tagging system.

In FIG. 2 a preferred implementation for creation of file tags according to the present invention is shown.

The implementation of FIG. 2 uses ASCII programs which fulfills the requirements of the present invention. Older programs are not considered in that implementation. Each ASCII program object has been marked either as ASCII or as EBCDIC program during its compilation process.

The decision is based on a flag associated with the main entry point. This flag is derived from the new compile option PROGRAM (EBCDIC|ASCII). The environment variable also called process CCSID, for example BPXCCSIDS=(EBCDIC_CCSID, ASCII_CCSID), is a default (e.g. IBM-1047, ISO 8859-1) which specifies what CCSIDs are to be assigned to a process executing an EBCDIC or ASCII program object.

The suitable values depend on the customer installation. The values are related to the default system codepage, settings of the terminal emulator, translation table for Network File Systems and codepage on connected workstations. Therefore, the intended purpose of this environment variable is to be set either system wide or at least session wide.

The possible values are limited to reasonable combinations which allow consistent conversion. The file tag is a file attribute that identifies the character set of text data within the file. Each file created by an ASCII program is tagged with a file tag. The file tag (TAGINFO) consists of TXTFLAG and CCSID. The TXTFLAG is a binary switch. ON means the file is a uniformly encoded text file. OFF means the file is not a uniformly encoded text file. TXTFLAG=ON (alias TEXT) implies that it can be safely converted to another codepage within the same character set to be processed by another program. TXTFLAG=OFF (alias NOTEXT) means that automatic conversion of that file is not allowed. The CCSID can be either a 16-bit number which has a corresponding long form that describes all aspects of a character set encoding (e.g. code page, character set, encoding scheme) or a designated binary file CCSID (x'FFFF').

Files, e.g. private files in the implementation of FIG. 2, may have the TXTFLAG "NOTEXT". That means the binary switch is off. These files will not be converted into another codepage or encoding scheme automatically. Since these files are exchanged only with programs using the same codeset or encoding scheme.

Files, e.g. control files in the implementation of FIG. 2, may have the TXTFLAG "TEXT". That means the binary switch is ON. These files will be converted automatically into another codeset or encoding scheme with the same character set. Automatic conversion is required since the ASCII file is used and eventually adapted or extended by the EBCDIC program and finally returned to the ASCII program.

Files, e.g. log files in the implementation of FIG. 2, may have the TXTFLAG "TEXT" however automatic conversion is not required since the receiving EBCDIC program does not read or write the files.

The CCSID can be either a 16-bit number which has a corresponding long form that describes all aspects of a character set encoding (e.g. code page, character set, encoding scheme) or a designated binary file CCSID. In FIG. 2 the CCSID for all files is ISO 8859-1.

Preferably, the directory entry of the file of concern will be physically extended by the file tag information, e.g. it is generally stored in the file system itself but not all file systems can store the file tag so it may also be specified on the mount command.

A preferred embodiment of a file tag consists of the following fields:
 CCSID: A 16-bit value that defines the file's character set. x'0000' means the file is not tagged; x'FFFF' means the file contains binary data.
 TXTFLAG: A qualifying flag that influences automatic conversion. ON indicates that the file is pure text of this CCSID and is thus eligible for auto conversion; OFF indicates that the file contains mixed data and it will not be converted.

The only files that may be auto converted have: TXTFLAG=ON and 0<CCSID<x'FFFF'.

Tagged files that have TXTFLAG=OFF would be used by programs that understand the contents of the file and that use the CCSID to convert those sections of the file to which it applies.

Figure 3:
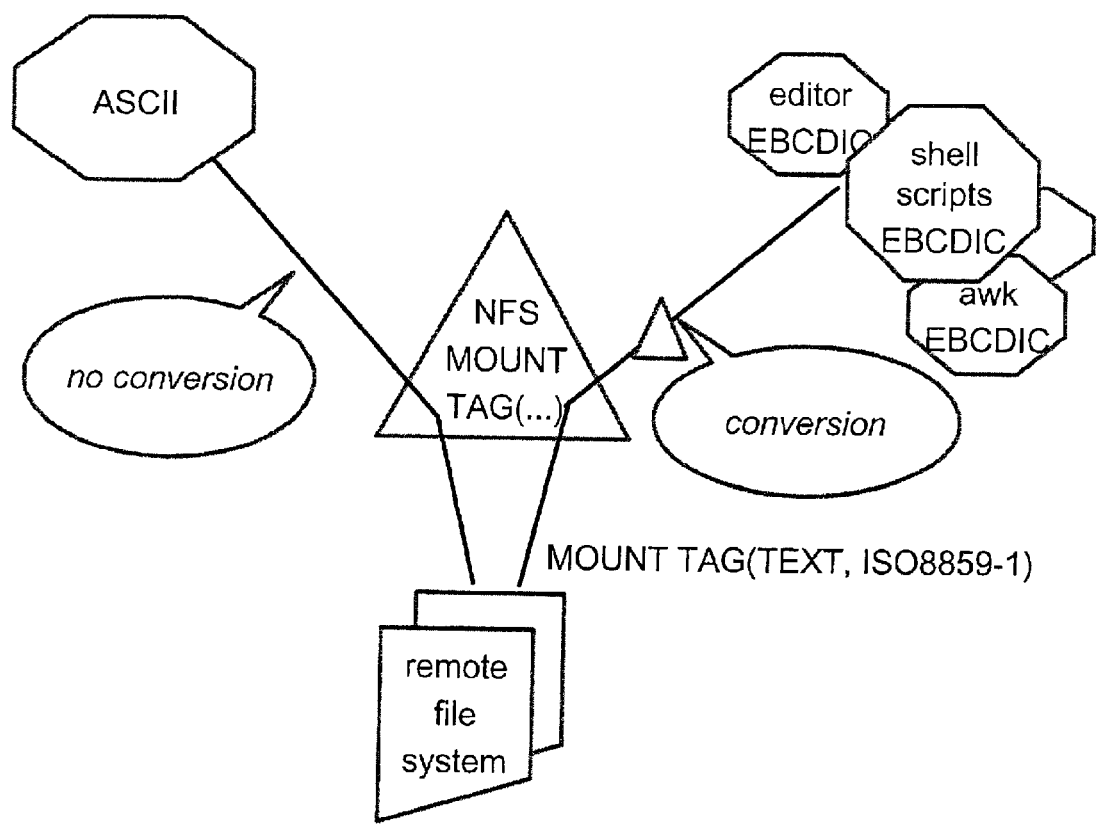
FIG. 3 shows a heterogeneous network using the present invention.

FIG. 3 shows a part of a heterogeneous network in which the present invention is implemented.

The heterogeneous network comprises a host system, e.g. IBM S/390, in which ASCII programs as well as EBCDIC programs are installed, and an ASCII workstation with a remote file system which communicates via a data connection with programs of the host system. Files will be exchanged between the ASCII workstation and ASCII and EBCDIC programs on the host.

In the case that the workstation platform does not support the file tagging according to FIG. 2, a default attribute is defined per mount point of the network file system. A new mount point option TAG (NOTEXT|TEXT, CCSID) allows to specify a default TAGINFO for untagged files ("virtual file tag"). When specified this tag info is used instead of the UNDEFINED (x'0000') value for all untagged files. If however the remote platform supports file tagging the existing file tag will be overwritten by a default attribute.

By reading or writing untagged files a file tag will be virtually allocated to the file of concern. The structure of the virtual file tag or mount tag is identical with the file tag.

Figure 4:
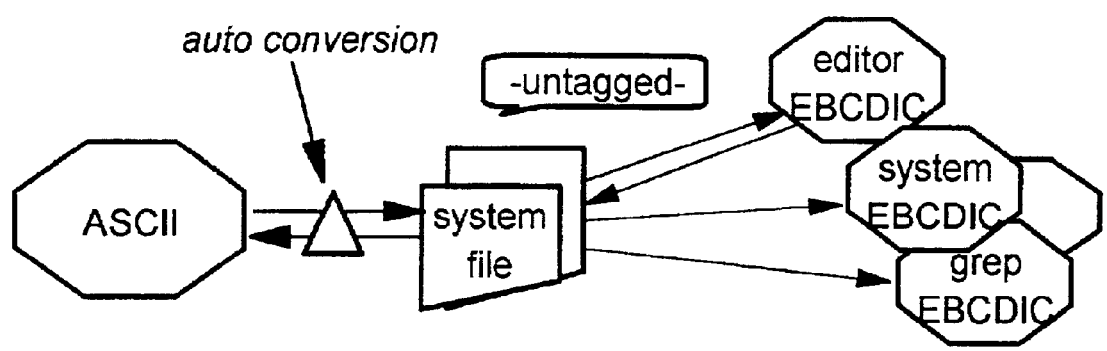
FIG. 4 shows a communication architecture dealing with the use of untagged files according to the present invention.

FIG. 4 shows a communication architecture dealing with the use of untagged files according to the present invention. An EBCDIC file will be exchanged between an ASCII program and an EBCDIC program. When the EBCDIC file is untagged it means the file has been created by a program not using the file tagging method according to the present invention. When accessing the EBCDIC file via an I/O access method the directory of the system file will be virtually extended by the "virtual file tag" when the mount option is switched "ON". Depending whether the default TXTFLAG is ON or OFF the system file will be converted into the ASCII encoding scheme by the auto conversion function. Auto conversion according to the present invention is a method that allows ASCII and EBCDIC programs to process the same text file. The conversion is transparent to the application. It applies both to reading and writing. Environment variable BPXAUTOCVT=ON|OFF enables or disables auto conversion. The intended scope of this variable is to be set system wide or session wide. For consistent auto conversion the user has to switch on this variable whenever he works with programs or files created by those programs that exploit file tagging and auto conversion features. The file tag is determined first; for new files it is specified according to the rules above. The auto conversion decision is done thereafter.

Figure 5:
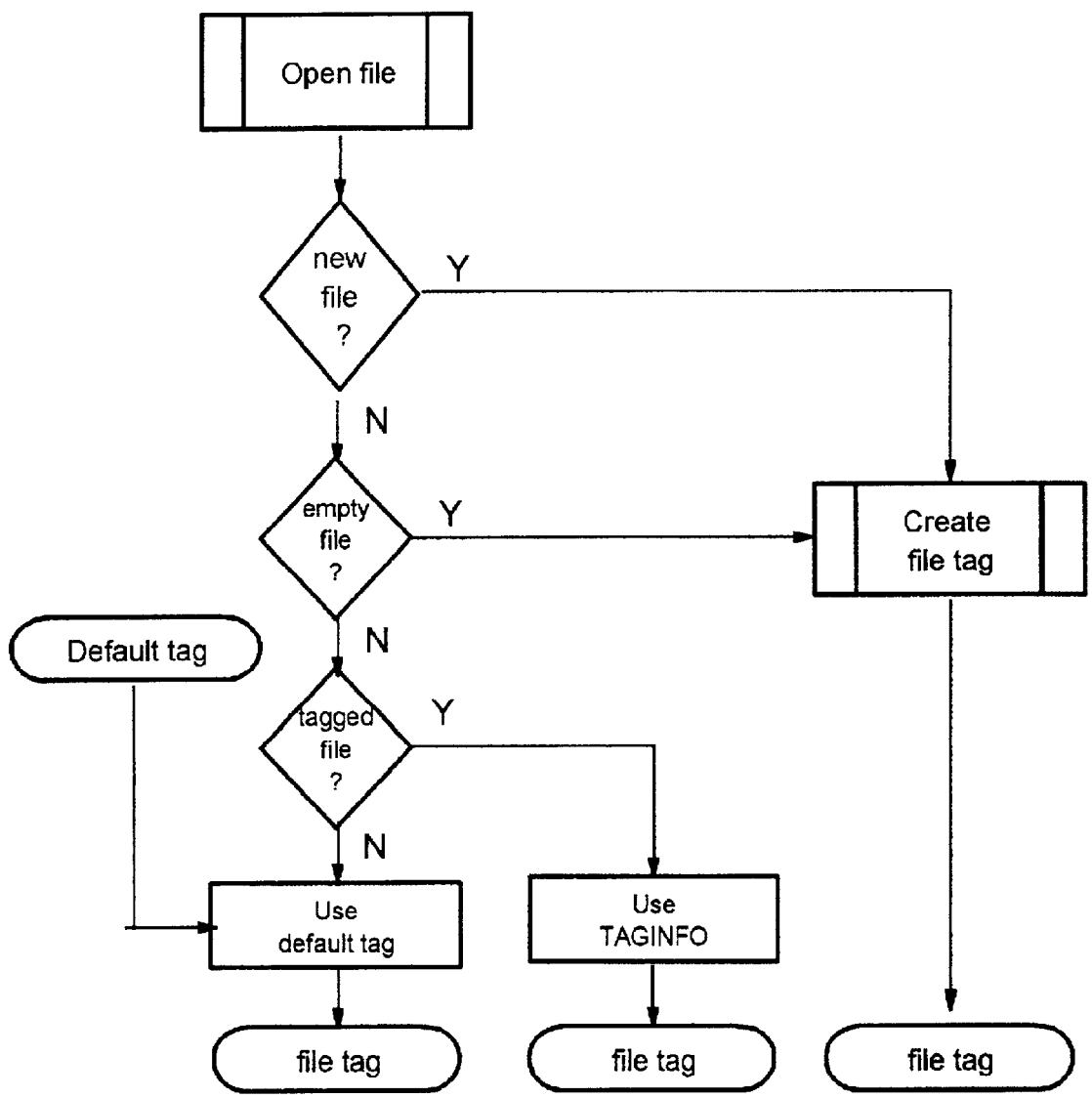
FIG. 5 shows the method steps for determining file tags according to the present invention.

FIG. 5 shows the single steps for determining a file tag according to the present invention.

When a file will be opened by an I/O access method using the present invention it will be checked first whether it is a new file. If yes, a file tag will be created containing the TXTFLAG and the process CCSID as disclosed above. The file tag will be laid down in the directory of the appropriate file.

If however the opened file is not new but an already existing file it will be checked in a next step whether it is an existing empty file. If yes, a file tag will be created and stored in the directory information. If not, it will be checked in a further step whether the file is already a tagged file. If it is a tagged file, the TAGINFO (file tag) will be used to determine the file tag information. If it is an untagged file the default tag will be used if available.

Figure 6A:
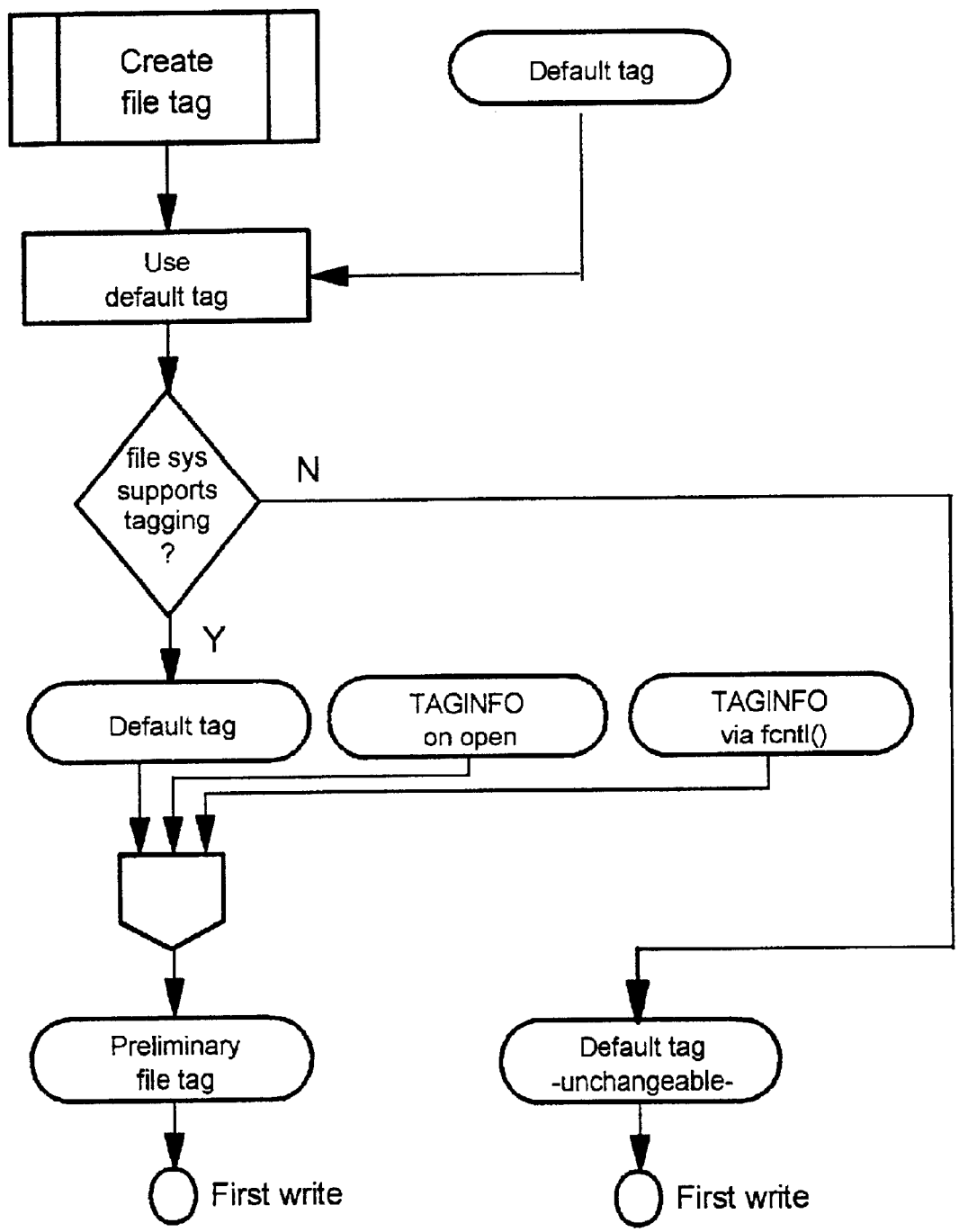
FIGS. 6a–6b shows the method steps for creating new file tags according to the present invention.
Figure 6B:
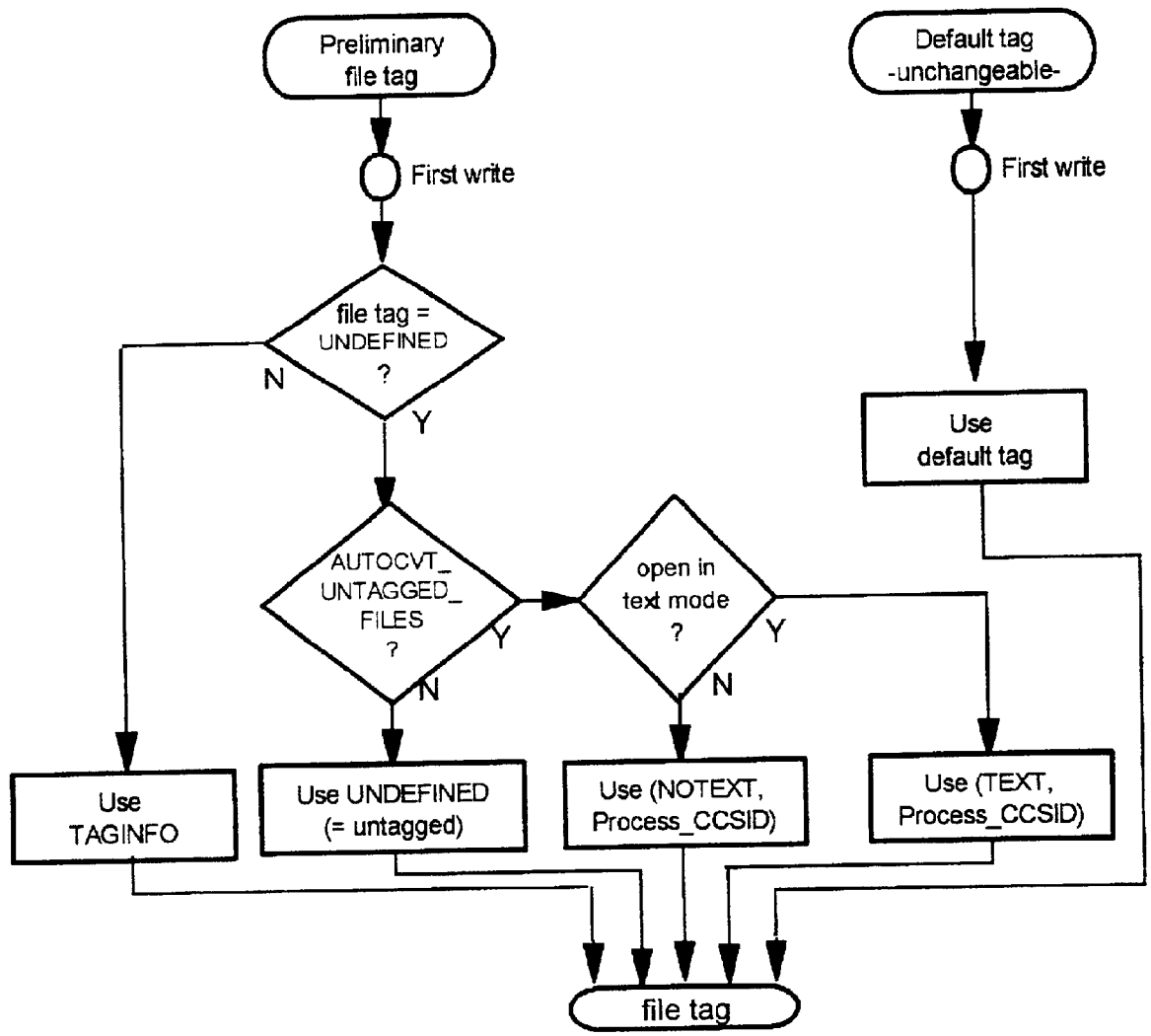

FIGS. 6A–6B show the individual steps for creating a new file tag according to the present invention.

The file tag can be set explicitly by a program at file open or via the file control operation fcntl( ) after opening, but only for new files and existing empty files. In either case the TXTFLAG is explicitly specified by the program doing open or fcntl( ), while the CCSID is either explicitly specified by the program or derived from the process CCSID.

If the file tag is not specified explicitly (untagged file) the runtime option AUTOTAG_NEW_FILES (ON|OFF) is inspected. If this option is set to ON the file will be tagged based on the following heuristic rules. When specifying this runtime option it is the responsibility of the application to ensure that those files that are exceptions to that rule are explicitly tagged. For function calls fopen( ) without 'b', popen( ), and for redirected stdout, stderr the TXTFLAG is set to ON and the CCSID is derived from the process CCSID. For all other function calls, that is fopen( ) with 'b' (binary), open( ), etc., TXTFLAG is set to OFF and the CCSID is derived from the process CCSID. If neither the file tag nor the runtime option is specified the file is not tagged. (If a mount option TAG has been specified this value is logically assigned to untagged files.) If the file system does not support file tagging the TAGINFO specified on open or via runtime option is ignored. An explicit attempt to set the TAGINFO via fcntl( ) returns an error.

Figure 7:
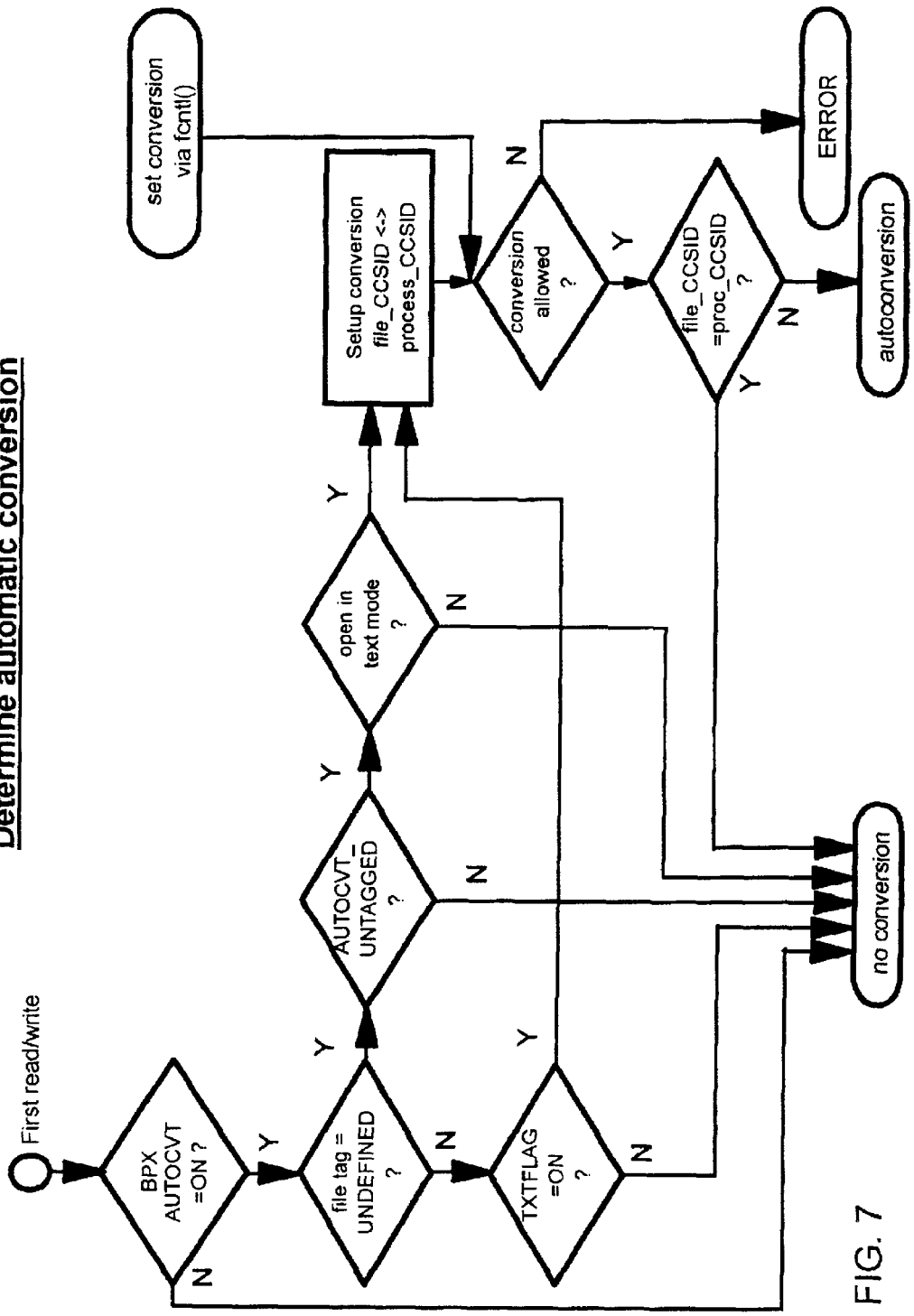
FIG. 7 shows the method steps for determining automatic conversion according to the present invention.

FIG. 7 shows the method steps for determining automatic conversion according to the present invention.

Auto conversion according to the present invention is a method that allows ASCII and EBCDIC programs to process the same text file. The conversion is transparent to the application. It applies both to reading and writing. An environment variable BPXAUTOCVT=ON|OFF enables or disables auto conversion. The intended scope of this variable is to be set system wide or session wide. For consistent auto conversion the user has to switch on this variable whenever he works with programs or files created by those programs that exploit file tagging and auto conversion features. The file tag is determined first; for new files it is specified according to the rules above. The auto conversion decision is done thereafter.

Assuming the environment variable BPXAUTOCVT is switched ON auto conversion is based on the information laid down in the file tag. The following cases may be distinguished:

1. If TXTFLAG is ON auto conversion between CCSID of the file and the process CCSID applies. If conversion is incompatible (or not supported) reading/writing this file is rejected and returns an error.
2. If TXTFLAG is OFF the file is processed without auto conversion.
3. If the TAGINFO is UNDEFINED (=untagged file and no mount option) the runtime option AUTOCVT_UNTAGGED_FILES (ON|OFF ) is inspected. If this option is set to ON the file will be auto converted based on the following heuristic rules. When specifying this runtime option it is the responsibility of the application to ensure that for those files that are exceptions to that rule, conversion is explicitly switched off. For function calls fopen( ) without 'b', popen( ) , and for redirected stdin, stdout, stderr the file TAGINFO is assumed to be TXTFLAG=ON and EBCDIC_CCSID. Auto conversion between the EBCDIC_CCSID and the process CCSID applies. If this conversion is incompatible (or not supported) reading/writing this file is rejected and returns an error. The value of EBCDIC_CCSID is derived from the environment variable BPXCCSIDS. For all other function calls, that is fopen( ) with 'b', open( ), etc., TXTFLAG is assumed to be OFF. No conversion applies. The function call fcntl( ) allows one to query the actual conversion mode, to switch on/off conversion and to choose any of the available conversion tables explicitly at any time.

Figure 8:
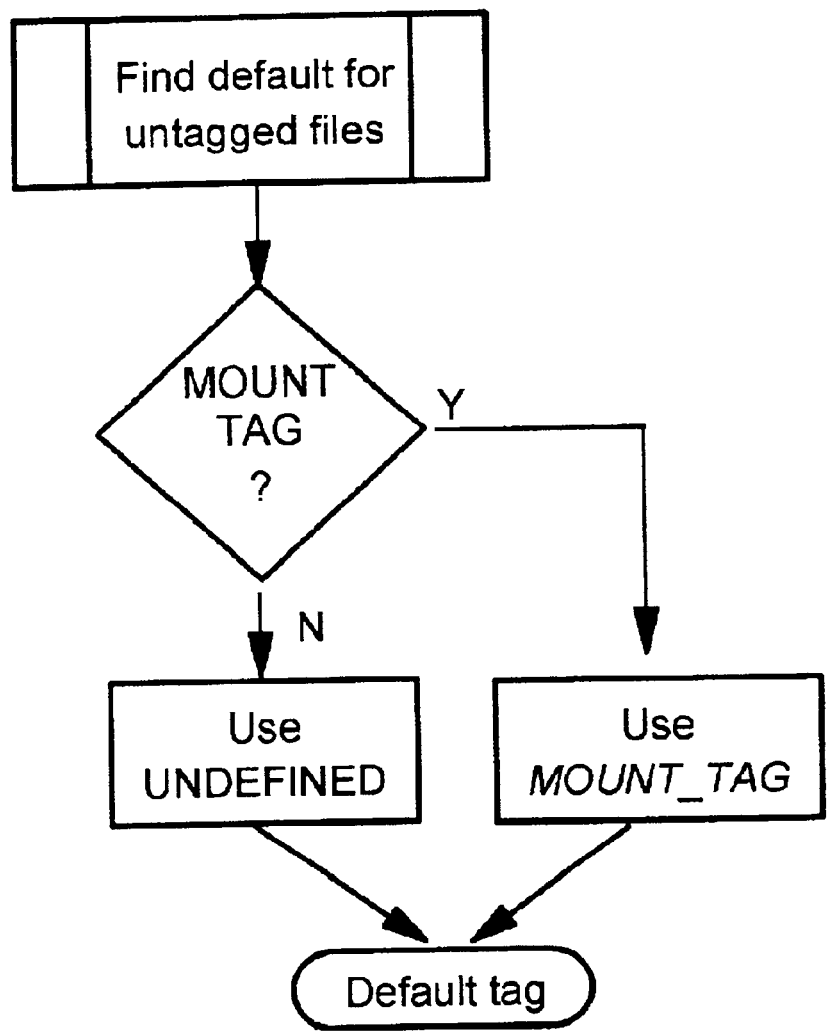
FIG. 8 shows the method for processing mount tags according to the present invention.

FIG. 8 shows the method for determining default tags according to the present invention.

If a file is untagged the inventive method checks whether a mount point option allows one to specify a default file tag for untagged files ("virtual tag"). When specified this file tag is used instead of the UNDEFINED (x'0000') value for untagged files. In summary, when a mount point option is available a MOUNT TAG will be stored into the file. When a mount option is not available the file will remain untagged or undefined with the consequence that auto conversion cannot take place.

What is claimed is:

1. A method for creating data for use in an environment using different encoding schemes, comprising the step of associating the following attribute information with said data:

a) an auto conversion flag for allowing or not allowing automatic conversion of said data into another encoding scheme; and
   b) an encoding scheme identifier for identifying an encoding scheme of said data
   wherein said auto conversion flag is laid down as a binary switch which when on means that said data is uniformly encode text and when off means that said data is not uniformly encode text data.

2. A method according to claim 1 in which said attribute information is added to said data.

3. A method according to claim 1 in which said attribute information is added to a directory of said data.

4. A method according to claim 1 wherein said data comprises a file.

5. A method according to claim 1 wherein said attribute information is added by a program at file open.

6. A method according to claim 4 wherein said attribute information is added by a program in a file control operation after opening.

7. A method according to claim 4 wherein said attribute information is added by a program performing an operation on said file.

8. A method according to claim 1 wherein said data comprises a pipe.

9. A method according to claim 1 wherein said data comprises a socket.

10. A method according to claim 1 wherein said data comprises a message queue.

11. A method according to claim 1 wherein initial program attribute information is used as attribute information.

12. A method according to claim 1 wherein a codepage according to current user settings is used as attribute information.

13. A method according to claim 1 wherein said auto conversion flag is derived from a program creating said data.

14. A method according to claim 1 wherein said encoding scheme identifier is derived from a program or from a system environment variable specifying which encoding scheme identifier is assigned to a process executing a program object marked with a certain encoding scheme.

15. A method according to claim 14 wherein said environment variable is set at least session wide.

16. A method according to claim 14 wherein said environment variable is set system wide.

17. A method according to claim 14 wherein said program object is marked with a specific encoding scheme during its compilation process.

18. A method according to claim 1 wherein said attribute information is automatically added upon creating a new file.

19. A method for processing data including data created according to claim 1 whereby reading or writing said data by a program comprises the steps of:

determining attribute information for said data to be processed; and
   automatically converting an encoding scheme of said data into another encoding scheme by an auto conversion function if said auto conversion flag is on and both said encoding scheme identifier and a process encoding scheme identifier allow conversion.

20. A method according to claim 19 wherein said auto conversion function is switched on by an environment variable when it works with programs or data created by programs exploiting auto conversion and creation of said auto conversion flag.

21. A method according to claim 19 comprising the further steps of automatically creating virtual attribute information for data having no attribute information by an automatic tagging function at runtime with the substeps of:
  determining the status of the auto conversion flag based on heuristic rules;
  deriving a file encoding scheme identifier from system settings or file system settings;
  virtually allocating said attribute information to said data; and
  automatically converting said data into said other encoding scheme by said auto conversion function if said auto conversion flag is on and both said file encoding scheme identifier and said process encoding scheme identifier allow conversion.

22. A method according to claim 21 wherein said step of automatically creating virtual attribute information is only carried out if said automatic tagging function is switched on by an environment variable.

23. A method according to claim 21 wherein said heuristic rules comprise the following steps:
  selling the auto conversion flag on if a function call to open the data in text mode is executed; and
  setting the auto conversion flag off if a function call to open the data in binary mode is executed.

24. A method according to claim 21 wherein said heuristic rules are used for function calls that implicitly open data.

25. A method according to claim 21 wherein said data having no attribute information is provided by a remote file system.

26. A computer program product containing parts of software code for executing the method in accordance with claim 1 when said software code is running on a digital computer.

* * * * *